United States Patent [19]

Gergely

[11] Patent Number: 4,938,597

[45] Date of Patent: Jul. 3, 1990

[54] LIGHT RESPONSIVE MOTION SENSING DEVICE

[75] Inventor: John S. Gergely, Ponca City, Okla.

[73] Assignee: Conoco Inc., Ponca City, Okla.

[21] Appl. No.: 184,455

[22] Filed: Apr. 21, 1988

[51] Int. Cl.$^5$ .................... G01P 13/00; G01P 15/00
[52] U.S. Cl. .................................... 356/373; 73/516 R
[58] Field of Search ............... 356/373, 26, 369, 398, 356/385, 432, 381, 382, 436; 73/516, 517; 250/231 R; 350/149

[56] References Cited

U.S. PATENT DOCUMENTS

| | | | |
|---|---|---|---|
| 2,324,340 | 7/1943 | Walker et al. | 177/352 |
| 3,164,022 | 1/1965 | Ensley | 73/516 |
| 3,597,043 | 8/1971 | Dreyer | 350/149 |
| 3,685,008 | 8/1972 | Bhuta et al. | 340/3 |
| 3,946,616 | 3/1976 | Jones, Jr. et al. | 73/516 R |
| 4,046,477 | 9/1977 | Kaule | 356/109 |
| 4,077,724 | 3/1978 | Briggs | 356/208 |
| 4,155,065 | 5/1979 | Stimler | 340/8 |
| 4,171,916 | 10/1979 | Simms et al. | 356/366 |
| 4,530,078 | 7/1985 | Lagakos et al. | 367/149 |
| 4,624,570 | 11/1986 | Bertollini | 356/373 |

Primary Examiner—Davis L. Willis
Assistant Examiner—Hoa Pham

[57] ABSTRACT

A motion sensing device which includes a means including a light source for sympathetic movement with the motion, a light responsive fluid contained in a resilient envelope contiguous to the light source to receive light from the source for either absorption or fluorescence illumination, and photo-responsive means contiguous to the resilient envelope to provide electrical output of the light absorption or fluorescence variations which are inversely or directly proportional, respectively, of said motion.

25 Claims, 3 Drawing Sheets

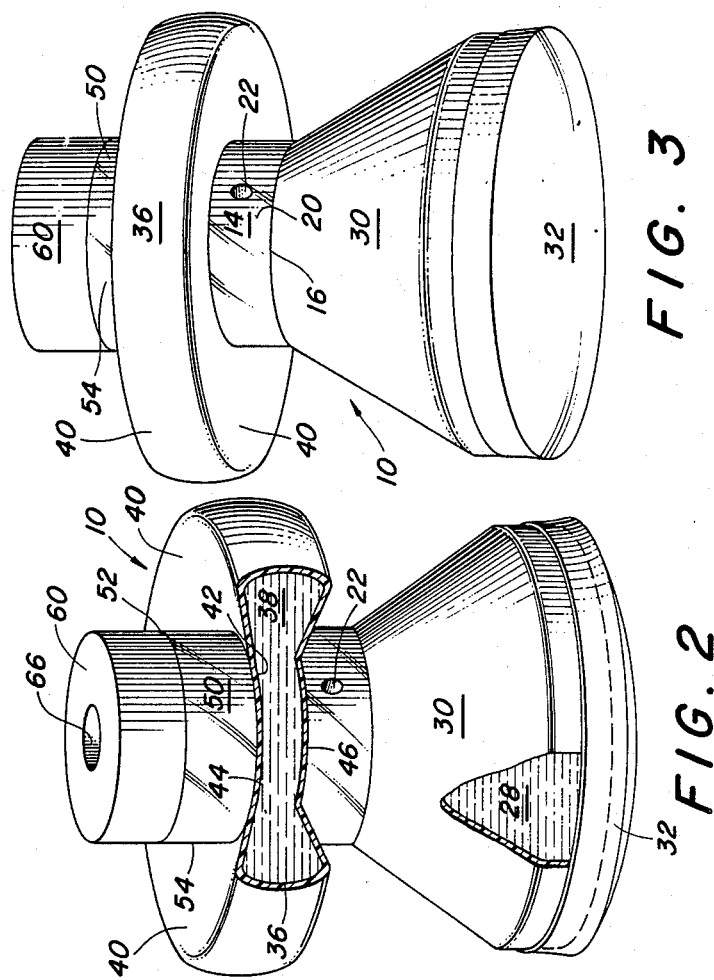
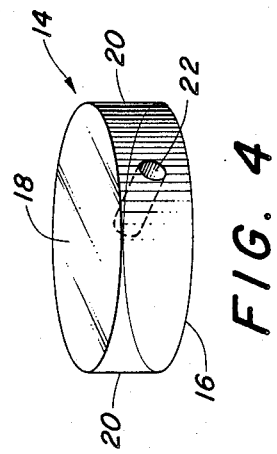
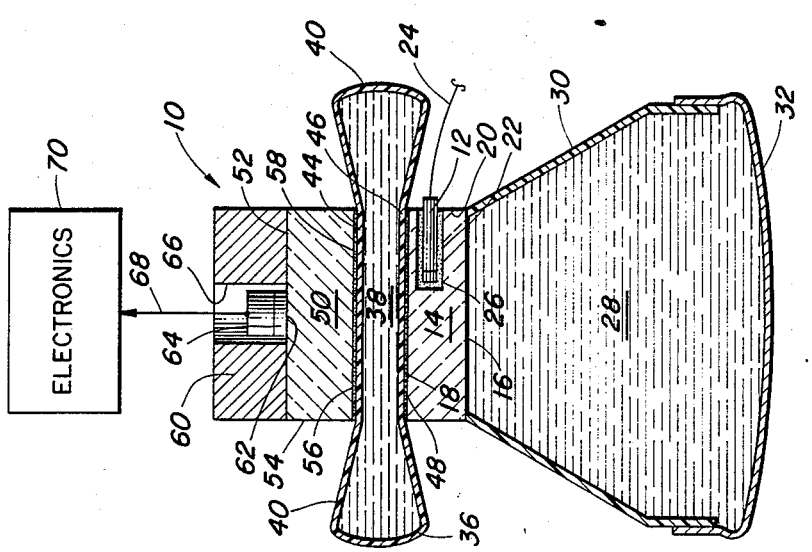
FIG. 3
FIG. 4
FIG. 2
FIG. 1

LIGHT RESPONSIVE MOTION SENSING DEVICE

BACKGROUND OF THE INVENTION

1. Field of the Invention

The invention relates to light responsive devices for developing an electrical output signal indicative of movement or vibration and, more particularly, but not by way of limitation, it relates to a motion sensing device that is responsive to either absorption or fluorescence of light radiation of predetermined wave lengths.

2. Description of the Prior Art

The prior art includes numerous types of motion sensing device which function in response to variation in light transmission. A relatively early form of seismic motion detector which was extremely sensitive to earth vibrations utilizes a laser light source for effecting light vibrations in response to extremely minimal vibrations as are detected and amplified for further processing. The U.S. Pat. No. 4,155,065 is considered to be of pertinence relative to the present invention as it is the closest related art known to Applicant albeit that it is not really anticipative of even the basic features of Applicant's invention. This patent teaches the use of a liquid having ceramic particles dispersed therein and utilizes the backscattering of laser energy to provide detector indication of acoustic signals. In this case, the suspended ceramic particles are oscillated by the impending acoustic waves at a particular frequency whereupon the backscattered light is detected and transformed into electrical signal output.

SUMMARY OF THE INVENTION

The present invention relates to an improved form of highly sensitive motion sensing device which utilizes a light source and a selected dye solution in order to provide detectable variations for producing an output signal. More particularly, the device includes a sealed bag of fluid for contacting and transmitting motion from a moving surface, which motion is transposed through a light source and confined volume of the dye solution to effect a variable light change. Such light change is then detected from within a reaction mass member movably supported on said dye solution enclosure which, in turn, produces an electrical signal indicative of the motion for output and distribution.

Therefore, it is an object of the present invention to provide a high sensitivity motion sensor.

It is also an object of the present invention to provide a seismic energy detector which is easily coupled to an earth surface or downhole location for vibration detection.

It is still further an object of the present invention to provide a detector device that can be positioned in any selected angular disposition to effect motion sensing.

Finally, it is an object of the present invention to provide a motion detector device that relies upon changes in light absorption and/or fluorescence to provide output data indication.

Other objects and advantages of the invention will be evident from the following detailed description when read in conjunction with the accompanying drawings which illustrate the invention.

BRIEF DESCRIPTION OF THE DRAWINGS

FIG. 1 is a view in vertical section of a light effect sensor constructed in accordance with the present invention;

FIG. 2 is a perspective view of the light effect sensor of FIG. 1 with parts shown in cutaway;

FIG. 3 is another perspective view of the light effect sensor of FIG. 1 with still further sectional showing;

FIG. 4 is a perspective view of a light source member as constructed in accordance with the present invention;

DETAILED DESCRIPTION OF THE INVENTION

Figure 5:
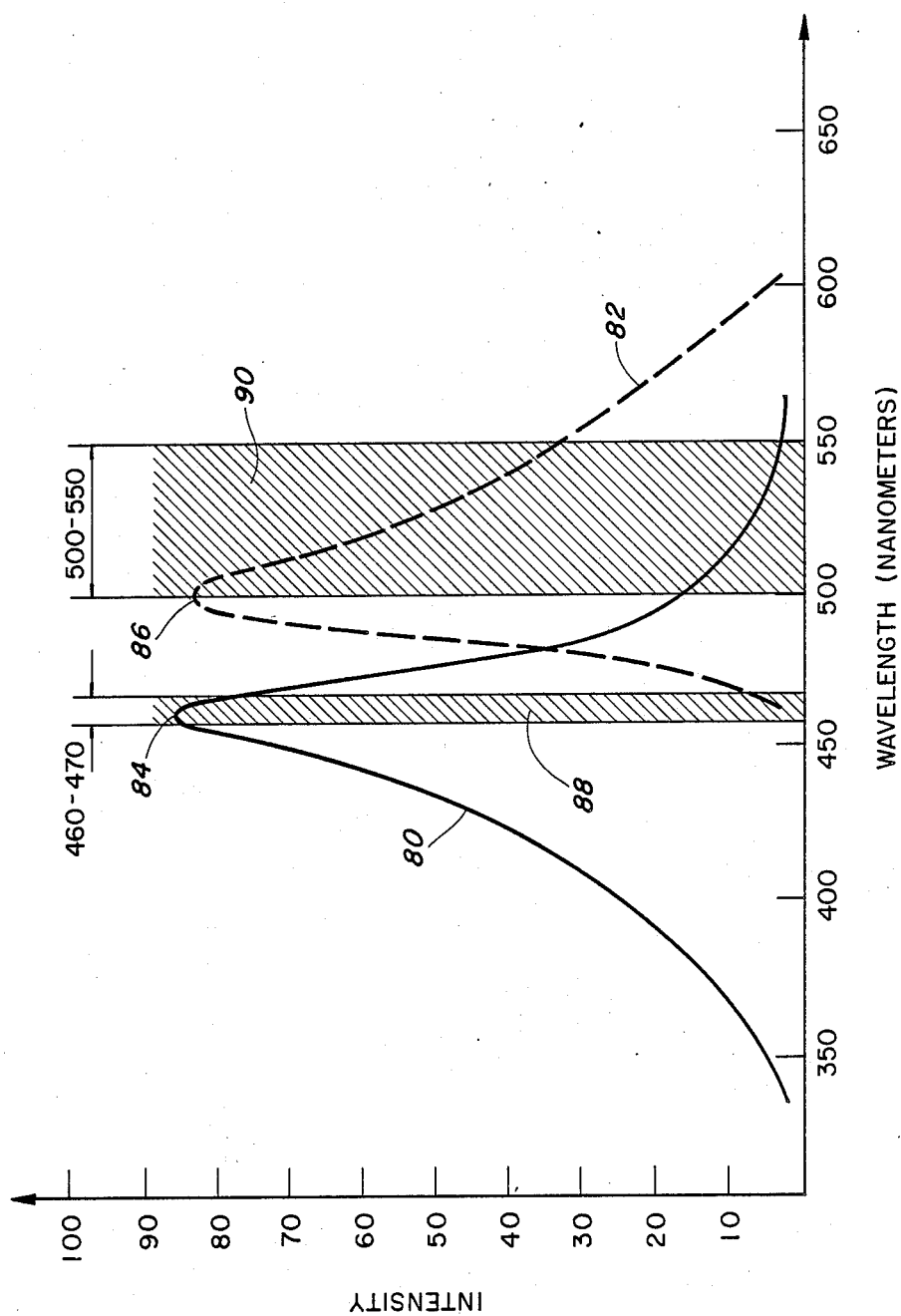
FIG. 5 is a graph of light intensity versus wavelength (in units of nanometers) illustrating the absorption and fluorescence relationships for one form of dye solution.

Referring to FIGS. 1-4, an acoustic energy sensor 10 is capable of measuring either fluorescence or absorption quality in order to determine the amplitude and frequency of acoustic signals. The sensor 10 can also serve to measure pressure signal variations. The sensor 10 includes a light source 12 as secured within such as a plexiglass block 14, in this case a cylindrical block having end surfaces 16 and 18 and side surface 20. The plexiglass block 14 is highly polished on end surface 16 and side surface 20 while end surface 18 is roughened to allow scattering light transmission out of block 14. Any material having the requisite index of refraction relative to the adjacent surface that will allow total internal reflection may be used for block 14, e.g., Lexan TM, lucite, etc.

A radial bore 22 is formed in block 14 to receive the light source 12 as secured therein. Light source 12 may be such as a blue or green LED energized via lead connection 24 as secured within bore 22 by means of a suitable cement having the same or similar index of refraction as the material of block 14. One suitable form of LED is a blue light emitting diode which is available from Siemens Components, Inc., Opto Electronics Division, Cupertino, Calif. This diode emits light over a wavelength range from about 440 to 560 nanometers (nm) centered at about 500 nm. As cement 26 provides matching refractive index into block 14, all light will be internally reflected within surfaces 20 and 16 since block 14 is selected to be of more optically dense material (greater refractive index) than the liquid 28 which is maintained adjacent the bottom surface 16, as will be further described.

The liquid 28 is contained within a cowl-like member 30 secured about the periphery of block 14. The cowl member 30 may be flexible, although it is not absolutely necessary, and a flexible sealing membrane 32 is secured over the outer, enlarged end of cowl member 30 to retain the liquid 28 therein. Liquid 28 and membrane 32 function to transmit any vibratory movement of membrane 32 to the block 14, and any suitable acoustic coupling liquid may be utilized as liquid 28, e.g., a glycerinbas liquid capable of exhibiting rapid dispositions.

The block 14 is secured adjacent a flexible dye reservoir 36 which includes a light responsive dye liquid 38 contained therein. The reservoir 36 is formed of flexible, transparent material to include an outer donut or ring portion 40 and an inner central portion 42 (See FIG. 2) which consists of circular transparent panels 44 and 46. The panels 44 and 46 are suitably bonded to the flexible ring portion 40 in fluid-tight relationship. Reservoir 36 allows for relative movement as between the upper and lower reservoir panels 44 and 46, respectively.

The roughened, light transmissive surface 18 of block 14 emits light through the transparent center panel 46 and into the dye liquid 38 whereupon both light absorption and fluorescence occurs, as will be further discussed below. A thin coating of light filter material 48 may be applied over light transmissive surface 18 to further define the bandwidth or wavelength range of transmitted light into the dye liquid 38. Any light indication from dye liquid 38 is then also transmitted into a block 50, also a cylindrical, internally reflective member as formed from such a plexiglas, lucite, Lexan ™, etc., and which is highly polished to contain internal light reflections on upper surface 52 and side surface 54. The bottom surface 56 is a roughened surface to allow light scatter transmission from the reservoir top panel 44 into the block 50. A restrictive light filter 58 may be employed to limit wavelength of light passing between dye liquid 38 and the interior block 50.

The block 50 rests upon top panel 44 and an annular collar 60 formed from such a metal is secured over the top surface 52 of block 50 to serve as a reaction mass for effecting relative movement between the blocks 14 and 50 and, therefore, reservoir panels 44 and 46 thereby to modulate the volume of dye liquid 38. Modulated light within block 50 can then only be transmitted through a roughened surface area 62 to a photo-responsive detector 64 disposed within a concentric bore 66 of collar 60. An electrical output on lead 68 is input to further electronics 70, e.g., a pre-amplifier or the like.

There are a number of dye substances that could be used as dye fluid 38 but one that has been found particularly suitable is a dye known as acriflavine. The acriflavine dye may be used in solution with a suitable solvent such as ethanol or water in concentration on the order of $1 \times 10^{-4}$ moles per liter. FIG. 5 illustrates the absorption curve 80 and the fluorescence curve 82 for acriflavine in terms of intensity versus wavelength. The absorption curve 80 indicates a peak 84 at about 465 nanometers while the fluorescence curve 82 shows a peak 86 at about 500 nanometers. A suitable filter coating of 460-470 nm is illustrated by shading 88 which intersects the absorption peak 84 and this filter coating is particularly suitable for application as input filter 48 adjacent block 14. A second filter coating of 500-550 nm is shown by shading 90 may be applied as output light filter 58 since it provides coverage of a good portion of the higher spectral intensity values for the fluorescence curve 82 to allow passage into the block 50 and detector 64.

In operation in the absorption mode, and referring to FIG. 1, the light source 12 is a light emitting diode emitting light in the 440-560 nm band and this covers both the absorption and the fluorescence wavebands for the acriflavine dye. Light emitted from source 12 is contained in block 14 and passes through an absorption bandwidth filter layer 48 and the reservoir panel 46 for travel through the dye liquid 38. Light not absorbed in dye liquid 38 then passes through panel 44 and filter layer 58 to the detector block 50 whereupon light output is seen through roughened surface 62 at photo-responsive detector 64 to provide an output indication via lead 68. In this case, filter layer 58 has the same spectral characteristics as filter layer 48 so that it passes the same wave lengths of light.

The flexible diaphragm or envelope 32 is placed in contact with a ground surface or other object of which vibrations are to be detected. Any such vibration or movement at diaphragm 32 is transmitted through liquid 28 and translated to block 14 through liquid dye 38, block 50, and reaction mass 60, thereby to vary the distance across liquid reservoir 36, i.e., between panels 44 and 46. Thus, as the distance between panels 44 and 46 enlarges or is made wider, more of the blue light is absorbed within dye liquid 38 to cause a corresponding decrease in light passing through filter layer 58 to the photo-responsive detector 64. That is, with an increase in width of the dye liquid 38 there is an inverse or decreased detection of blue light within the absorption band.

Thus, the output of the photo-responsive detector 64 will be a constant DC value when no acoustic signal or motion is present at the diaphragm 32, and when acoustic signal or movement is detected, the width of the active dye region between panels 44 and 46 will increase and decrease in response. Amplitude may be calibrated with known acoustic input signals to the diaphragm 32, and the frequency can be determined by comparing crossovers about the D-C value, or about zero if the electrical output is A-C coupled. The amount of light absorption can be measured using the relationship $$I = I_0 e^{-\sigma_A N l} \quad (1)$$

where,
 I = intensity of the transmitted light
 $I_0$ = intensity of the incident light
 $\sigma A$ = absorption cross section of the organic dye molecule in centimeters squared (cm$^2$)
 N = number of molecules per centimeter cubed (cm$^3$)
 l = width of the active dye region in nanometers (nm)

Operating in the fluorescent mode, light from the source 12 within block 14 is emitted through a band limiting filter coating 48 in the range of 460-470 nm. Presence of this light within the acriflavine dye liquid 38 between movable panels 44 and 46 will cause fluorescence in the 500-550 nm band and this light is transmitted through filter coating 58 which has a wide pass band admitting the 500-550 nm wave lengths. This light is then contained within light block 50 and presented through surface 62 to the photo-responsive detector 64.

The mechanism for sensing motion is the change in fluorescence intensity within dye liquid 38 due to a change in the width of the region of dye fluorescence. That is, movement of liquid 28 causing narrowing between panels 44 and 46 will cause a proportionate decrease in fluorescence and a proportionate decrease in detected photoelectric signal. The fluorescence mode works similar to the absorption mode except that the output detector signal is directly proportional to the instantaneous width of the active dye region between envelope panels 44 and 46. Fluorescence will occur in accordance with PS $$I_F = I_0 e^{\sigma_F N l} \quad (2)$$

where,
 $I_F$ = fluorescence intensity, and
 $\sigma F$ = fluorescence cross section of the organic dye molecule in centimeters squared.

Figure 6:
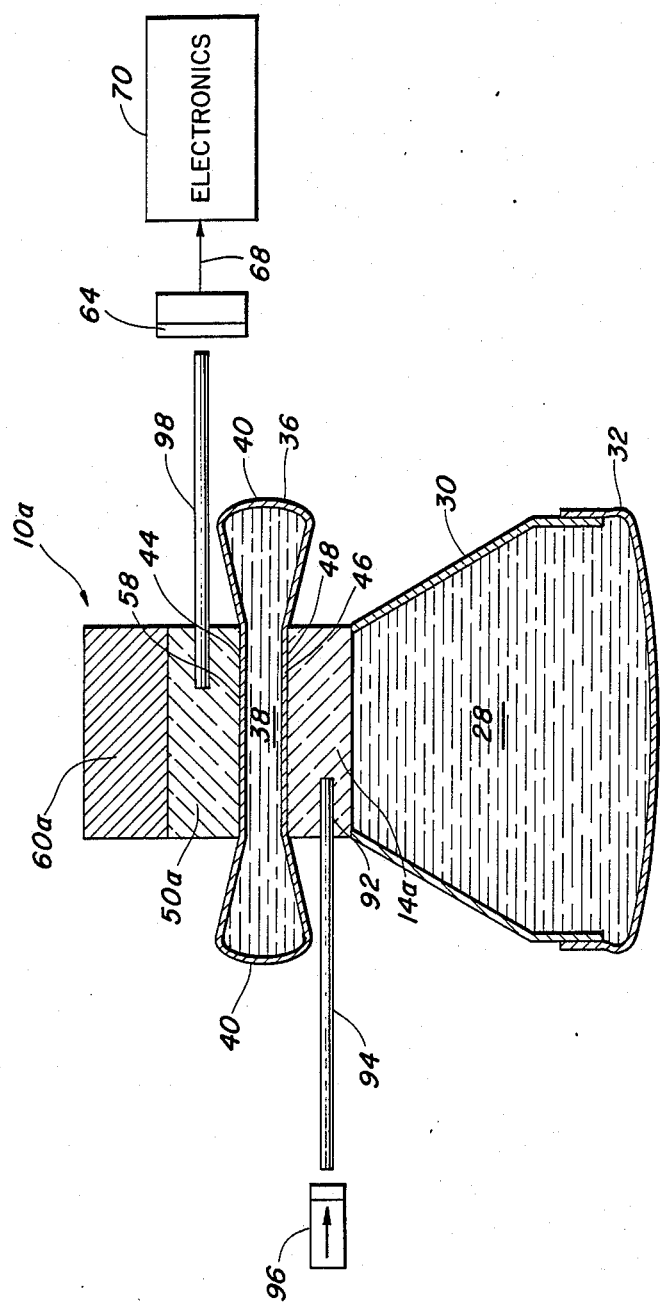
FIG. 6 is a vertical section of an alternative form of light effect device utilizing fiber optic interconnections.

Referring to FIG. 6, the device can be made electrically passive by using fiber cable to channel light to and from the sensor device 10a. The light block 14a is formed with a bore 92 which has a fiber optic cable 94 tightly secured therein. Light input, such as the selected LED diode emitting blue light is provided at source 96 for injecting blue light of the requisite band width through fiber optic cable 94 for internally reflected containment within block 14a. The requisite filter coatings are applied at surfaces 44 and 46 to allow either absorption or fluorescence sensing from the liquid dye 38 between movable panels 44 and 46. Light passed into light block 50a may then be transmitted along a fiber optic cable 98 whereupon it is detected by a remote photo-responsive detector 64 and electrical signal is applied to electronics 70.

The remote location of the light source 96 and detector 64 may be desirable for carrying out vibration sensing in particular seismic applications such as at subsurface, downhole or other locations having difficult accessibility. The foregoing discloses a novel motion detection device for use in vibratory sensing or pressure monitoring applications. The particular form of sensor device is quite versatile as it is capable of adjustment and variation as regards the response parameters of the acoustic coupling medium as well as the operating wavelength and selection of pass band while operating in either the absorptive or the fluorescent mode. The device is capable of being assembled in minute form while exhibiting extreme rugged construction for use in any of a number of varying types of situations.

Changes may be made in combination and arrangement of elements as heretofore set forth in the specification and shown in the drawings; it being understood that changes may be made in the embodiments disclosed without departing from the spirit and scope of the invention as defined in the following claims.

What is claimed is:

1. A motion sensing device, comprising:
    fluid means providing movement sympathetic to a moving force;
    a light source secured for movement with said fluid means and directing a light output;
    a pliable enclosure containing a dye solution juxtaposed to said light source whereby the dye solution is illuminated by said light output; and
    photo-responsive detector means positioned adjacent said pliable enclosure and movable relative to said light source, said detector means providing an electrical output indicative of the illuminated dye solution and proportional to said movement.

2. A device as set forth in claim 1 wherein:
    said illuminated dye solution is a light absorption indication.

3. A device as set forth in claim 2 wherein:
    said electrical output is inversely proportional to said movement.

4. A device as set forth in claim 1 wherein:
    said illuminated dye solution is a light fluorescence indication.

5. A device as set forth in claim 4 wherein:
    said electrical output is directly proportional to said movement.

6. A device as set forth in claim 1 wherein said means providing movement comprises:
    a resilient container member containing fluid secured adjacent said light source for contact with said moving force.

7. A device as set forth in claim 6 wherein said container member comprises:
    a cowl member secured adjacent said light source; and
    a resilient diaphragm sealingly secured to close over said cowl member.

8. A device as set forth in claim 1 wherein said light source comprises:
    a block of material exhibiting total internal light reflection except one light transmissive surface which is juxtaposed to said pliable enclosure; and
    illumination means sealed within said block of material.

9. A device as set forth in claim 8 wherein said block of material comprises:
    a cylindrical block of Plexiglas which is polished on all surfaces except the juxtaposed surface which is roughened to allow light emission.

10. A device as set forth in claim 9 which further includes:
    a light filter coating interposed between said juxtaposed surface and said pliable enclosure.

11. A device as set forth in claim 9 wherein:
    said illumination means emits blue light in the 440 to 560 nanometers range.

12. A device as set forth in claim 8 wherein:
    said illumination means emits blue light in the 440 to 560 nanometers range.

13. A device as set forth in claim 1 which further includes:
    a light filter element interposed between said light source and pliable enclosure.

14. A device as set forth in claim 13 wherein:
    said dye solution is acriflavine and said light filter coating passes light in an absorption range of wavelengths.

15. A device as set forth in claim 14 which further includes:
    a second light filter element interposed between said pliable enclosure and said photoresponsive detector which passes light in an absorption band of wavelengths.

16. A device as set forth in claim 14 which further includes:
    a second light filter element interposed between said pliable enclosure and said photoresponsive detector which passes light in the fluorescence band of wavelengths.

17. A device as set forth in claim 1 which further includes:
    a second light filter element interposed between said pliable enclosure and said photoresponsive detector means.

18. A device as set forth in claim 1 wherein said detector means comprises:
    a block of material exhibiting total internal light reflection except one light transmissive surface which is positioned adjacent said pliable enclosure to receive light therefrom; and
    a light detector directed within said block of material to produce an electrical output.

19. A device as set forth in claim 18 which further includes:
    a light filter coating interposed between said light transmissive surface and said pliable enclosure.

20. A device as set forth in claim 19 wherein:

said dye solution is acriflavine and said light filter coating passes light to an absorption range of wavelengths.

21. A device as set forth in claim 20 which further includes:
a second light filter element interposed between said pliable enclosure and said photoresponsive detector which passes light in an absorption band of wavelengths.

22. A device as set forth in claim 20 which further includes:
a second light filter element interposed between said pliable enclosure and said photoresponsive detector which passes light in the fluorescence band of wavelengths.

23. A device as set forth in claim 1 wherein said light source comprises:
a remote light emitting device;
an internally reflective block having one emitting surface juxtaposed to said pliable enclosure; and
a fiber optic link conducting light from said remote light emitting device into said internally reflective block.

24. A device as set forth in claim 23 wherein said detector means comprises:
an internally reflective block having one light transmissive surface directed toward said pliable enclosure;
a remotely located photo-detector; and
a fiber optic link conducting light from within said block into view of said photo-detector.

25. A device as set forth in claim 1 wherein said detector means comprises:
an internally reflective block having one light transmissive surface directed toward said pliable enclosure;
a remotely located photo-detector; and
a fiber optic link conducting light from within said block into view of said photo-detector.

* * * * *